United States Patent
Chang et al.

(10) Patent No.: US 7,340,127 B1
(45) Date of Patent: Mar. 4, 2008

(54) FULL-BAND OPTICAL SPECTRUM ANALYZER AND METHOD

(75) Inventors: Paul Chang, Fremont, CA (US); Ke-Cai Zeng, Hayward, CA (US)

(73) Assignee: Sunrise Telecom Incorporated, San Jose, CA (US)

( * ) Notice: Subject to any disclaimer, the term of this patent is extended or adjusted under 35 U.S.C. 154(b) by 39 days.

(21) Appl. No.: 11/048,455

(22) Filed: Jan. 31, 2005

(51) Int. Cl.
*G02B 6/28* (2006.01)
(52) U.S. Cl. .......................................... 385/24
(58) Field of Classification Search ............... None
See application file for complete search history.

(56) References Cited

U.S. PATENT DOCUMENTS 4,995,724 A * 2/1991 Sonobe et al. ............. 356/319
6,687,009 B2 * 2/2004 Hui et al. .................. 356/477
6,993,257 B2 * 1/2006 Althouse et al. ............. 398/34
2001/0030745 A1 10/2001 He et al.

* cited by examiner

*Primary Examiner*—Sung Pak
*Assistant Examiner*—Hoang Tran
(74) *Attorney, Agent, or Firm*—Mikio Ishimaru

(57) ABSTRACT

A method for optical spectrum analysis provides a tunable optical filter and scans a wavelength range of an optical signal that is larger than the free spectrum range of the tunable optical filter. The optical signal is filtered through the tunable optical filter. Separate multiple optical orders of the wavelengths scanned and filtered by the tunable optical filter are individually detected.

10 Claims, 7 Drawing Sheets

FULL-BAND OPTICAL SPECTRUM ANALYZER AND METHOD

TECHNICAL FIELD

The present invention relates generally to optical spectrum analysis, and more particularly to broad wavelength range optical spectrum analyzers utilizing Fabry-Perot filters.

BACKGROUND ART

The fiber optics telecommunications field includes such technologies as fiber optical cables and fiber optical networks. Fiber optical networks carry a great variety of everyday information signals, such as conversations, data communications (e.g., fax messages), computer-to-computer data transfers, cable television, the Internet, and so forth. Such information signals are transported between cities as well as from place to place within cities. Due to the rapidly increasing amounts of such communication traffic, the increased capacity of fiber optical cables is more and more necessary, compared to the lower capacities of older metallic wire cables.

An optical fiber cable is typically composed of a bundle of individual optical fibers. One single optical fiber can carry thousands of data and communication signals on a single wavelength of light. That same single optical fiber can also carry multiple wavelengths of light, thus enabling it to carry many, many multiple optical signals at the same time. Each wavelength alone can carry data that transfers at a rate over 10 Gbit/s.

To maintain communications over such optical networks, it is necessary to perform a variety of sensitive analyses, such as measuring the optical power, wavelength, and the optical signal-to-noise ratio of the optical signals at each of the wavelengths traveling through the optical fiber. Such analysis is carried out by an analytical tool called an optical spectrum analyzer ("OSA"). The OSA performs optical spectrum analysis (also referred to as "OSA"), which, as indicated, is the measurement of optical power as a function of wavelength.

OSA applications include testing laser and/or light-emitting diode ("LED") light sources for spectral purity and power distribution, monitoring an optical transmission system of a wavelength division multiplexing ("WDM") system for signal quality and noise figures, testing transmission characteristics of various optical devices and components, and so forth.

OSA is typically performed by passing an optical signal to be analyzed through a tunable optical filter. "Tunable" means that the filter can be adjusted to resolve or pick out the individual components (wavelengths) of the optical signal.

The optical resolution of an OSA is the minimum wavelength spacing between two spectral components that can be reliably resolved. To achieve high optical resolution, the filter should have a sufficiently narrow 3-dB bandwidth ("BW"). Additionally, for many measurements the various spectral components to be measured are not of equal amplitudes, in which case the BW of the filter is not the only concern. Filter shape, which is specified in terms of the optical rejection ratio ("ORR") at a certain distance (e.g., ±25 GHz) away from the peak of the transmission, is also important. An example is the measurement of side-mode suppression of a distributed feedback ("DFB") laser and measuring the optical-signal-to-noise ("OSNR") of the various wavelength channels in WDM optical communications systems.

Three basic types of filters are widely used to make OSAs: diffraction gratings, Fabry-Perot ("FP") filters, and Michelson interferometers. A tunable FP filter ("TFPF") has many advantages for OSA. Principal among these are its relatively simple design, small size, fast speed, ease of control, and its great sensitivity for distinguishing optical signals that are very closely spaced (i.e., signals that have frequencies or wavelengths that are very nearly the same.)

The wavelength scanning range of the FP filter OSA is defined by its free spectrum range ("FSR"). For the same finesse value, the FP filter's BW is proportional to its FSR, which means the larger the FSR, the poorer the resolution. Thus for many FP filter OSA applications, there are two major challenges. One challenge is to achieve a very high dynamic range for optical signal-to-noise-ratio ("S/N") measurements (for example, for characterizing a dense wavelength division multiplexing ("DWDM") system). The other is to achieve a very wide scanning range of wavelengths (for example, from 1260 nm to 1630 nm) while maintaining a sufficiently narrow bandwidth.

A FP filter OSA has a limited wavelength scanning range as defined by the filter's FSR, which is the spectral separation between adjacent Fabry-Perot orders (optical orders) that can be tuned without overlap. The FSR is related to the full-width half-maximum of a transmission band by the FP filter's finesse. FP filters with high finesse desirably show sharper transmission peaks with lower minimum transmission coefficients.

A FP filter can be fabricated to have a very narrow 3-dB BW, thus providing very good spectral resolution. The FP filter's FSR is proportional to the mathematical product of the filter's BW and its finesse. If the BW becomes smaller, the finesse needs to be larger to maintain the same FSR. For the same finesse value of the FP filter, the larger the FSR, the larger the BW. This is not desirable in many applications since the larger the BW, the poorer the spectral resolution. Thus, in using a FP filter to construct an OSA, there is yet another challenge, which is that the filter's FSR will limit the filter's wavelength scanning range.

A need thus remains for methods and apparatus that can scan a broad wavelength range, that is substantially larger than the FP filter's inherent FSR, while maintaining a sufficiently narrow BW and thus excellent spectral resolution. In view of the ever-increasing need to save costs and improve efficiencies, it is more and more critical that answers be found to these problems.

Solutions to these problems have been long sought but prior developments have not taught or suggested any solutions and, thus, solutions to these problems have long eluded those skilled in the art.

DISCLOSURE OF THE INVENTION

The present invention provides a method for optical spectrum analysis. A tunable optical filter is provided. A wavelength range of an optical signal that is larger than the free spectrum range of the tunable optical filter is scanned. The optical signal is filtered through the tunable optical filter. Separate multiple optical orders of the wavelengths scanned and filtered by the tunable optical filter are individually detected.

Certain embodiments of the invention have other advantages in addition to or in place of those mentioned above. The advantages will become apparent to those skilled in the art from a reading of the following detailed description when taken with reference to the accompanying drawings.

BEST MODE FOR CARRYING OUT THE INVENTION

Figure 2:
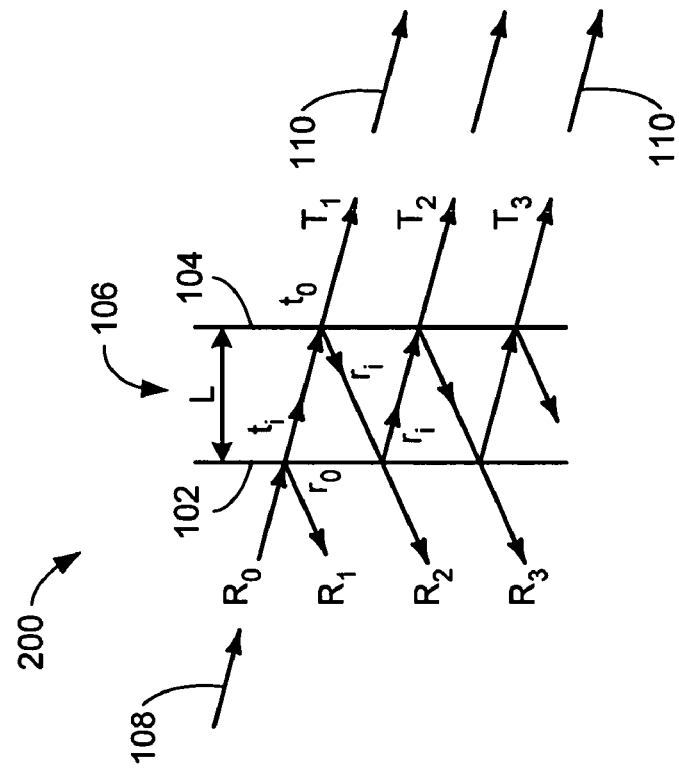
FIG. 2 is a vector diagram depicting the light beams and attendant electric fields in the tunable Fabry-Perot interferometer of FIG. 1.

In the following description, numerous specific details are given to provide a thorough understanding of the invention. However, it will be apparent that the invention may be practiced without these specific details. In order to avoid obscuring the present invention, some well-known circuits and system configurations are not disclosed in detail. Likewise, the drawings showing embodiments of the apparatus are semi-diagrammatic and not to scale and, particularly, some of the dimensions are for the clarity of presentation and are shown exaggerated in the drawing FIGs. In addition, where multiple embodiments are disclosed and described having some features in common, for clarity and ease of illustration, description, and comprehension thereof, similar and like features one to another will ordinarily be described with like reference numerals.

It has been discovered, according to the teachings of the present invention, that a full band optical spectrum analyzer ("OSA") with a wavelength scanning range of 380 nm can be implemented utilizing a tunable Fabry-Perot ("FP") filter. In one embodiment, the FP filter has a free spectrum range ("FSR") of about 180 nm and a 3-dB bandwidth ("BW") less than 80 pm between 1470 and 1640 nm. In the other wavelength region, from about 1260 to 1470 nm, the FSR is slightly smaller. Well-defined band pass filters ("BPFs") are then used to enable multiple optical orders of the FP filter to scan a very broad wavelength range, e.g., from 1260 nm to 1640 nm, which covers the full telecommunication wavelength bands, e.g. the O, E, S, C, and L bands. Depending upon the isolation of the BPFs, optical signal isolation between different bands can be greater than 45 dB. The FP filter-based OSA in this embodiment then has a wavelength scanning range much greater than the FP filter's FSR.

Figure 1:
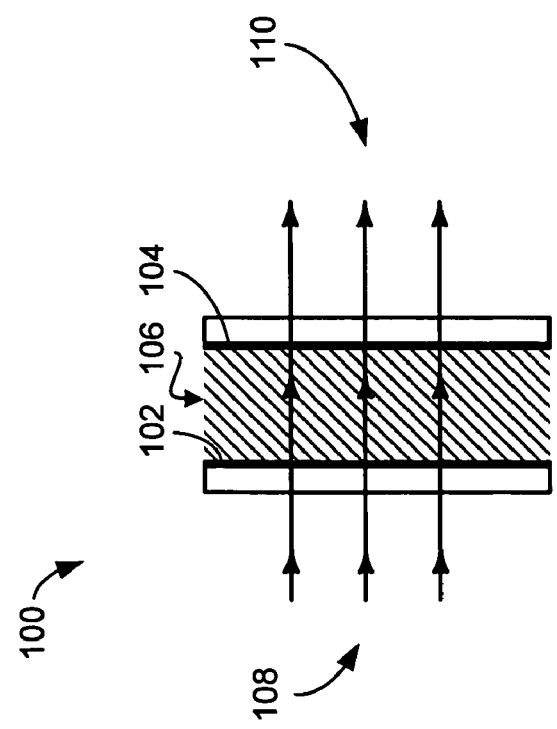
FIG. 1 is a schematic representation of a tunable Fabry-Perot interferometer.
Figure 4:
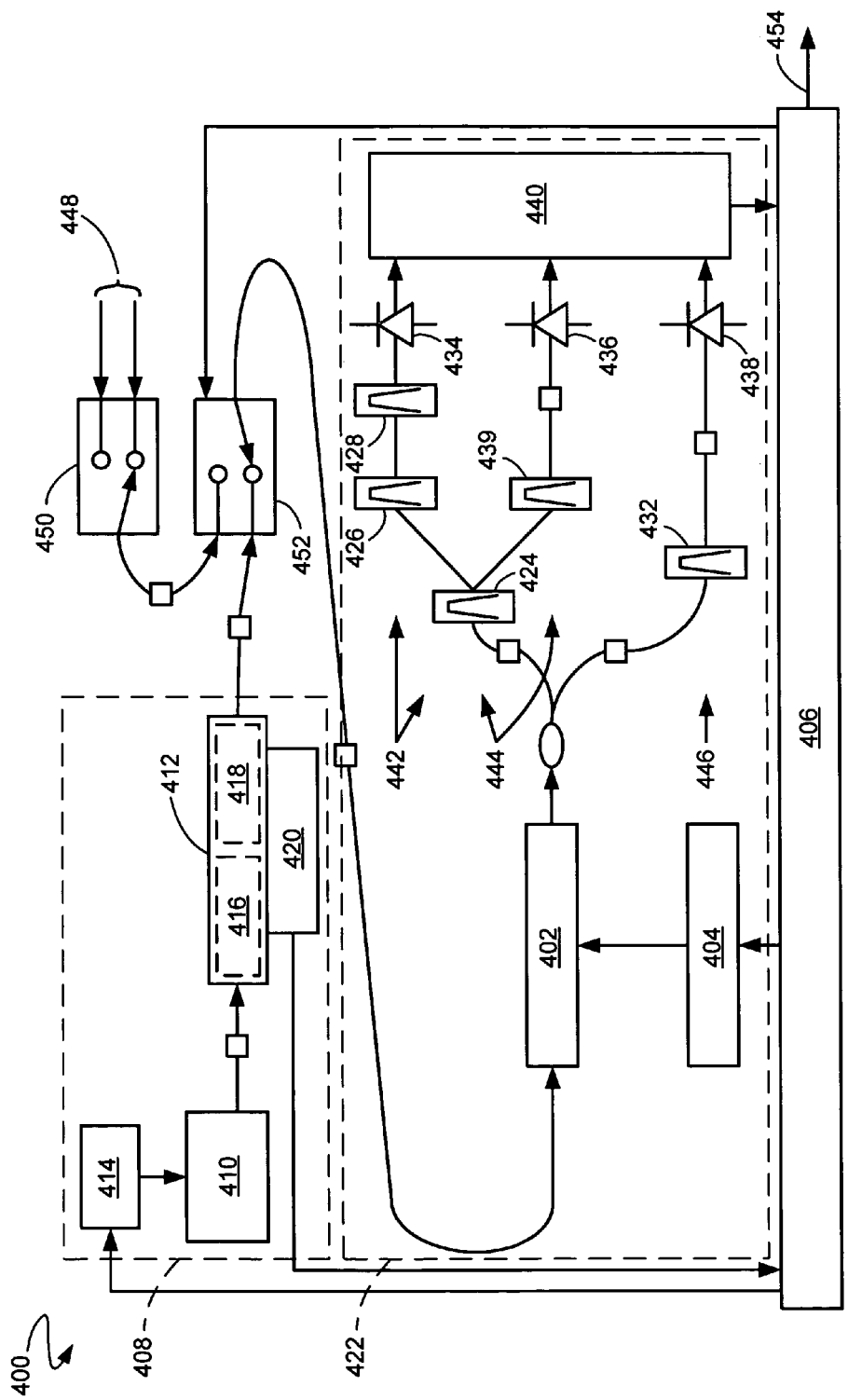
FIG. 4 is an optical circuit schematic diagram of a full band optical spectrum analyzer according to an embodiment of the present invention.

Referring now to FIG. 1, therein is shown a schematic representation of a tunable FP interferometer ("FPI") 100, utilized in the present invention as the tunable FP filter ("TFPF") 402 (not shown, but see FIG. 4) in the full band OSA 400 (FIG. 4). The FPI 100 has mirrors 102 and 104 defined therein that are partially reflective. The mirrors 102 and 104 are separated by a gap, such as a cavity 106, filled with an appropriate dielectric medium such as air, glass, and so forth. Light rays 108 enter the FPI 100, pass through it, and then exit the FPI 100 as transmitted, filtered light rays 110.

Referring now to FIG. 2, therein is shown a vector diagram 200 depicting the interactions and the analysis of the incident, reflected, and transmitted light beams and their attendant electric fields in a FP filter with an air gap. The incident electric field $R_0$ of the light rays 108 is partially reflected at the mirror 102 with a factor of $r_o$ (for "reflected outside" the cavity 106), and partially transmitted with a factor $t_i$ (for "transmitted inside" the cavity 106). When the transmitted electric field with factor $t_i$ in the cavity 106 passes out of the cavity 106 through the mirror 104, it appears delayed and multiplied with factor $t_o$ behind the mirror 104. The reflected rays $R_1$, $R_2$, $R_3$, and so on, from the mirror 102, will experience maximum destructive interference, and the transmitted rays $T_1$, $T_2$, $T_3$, and so on, from the mirror 104, will experience maximum constructive reinforcement, when the following equation is met:

$$\frac{2\pi nL}{\lambda} = m\pi, \qquad (1)$$

where:

m is any integer>0,

L (FIG. 2) is the length of the resonant cavity (e.g., the cavity 106), n is the refractive index of the medium inside the resonant cavity, and $\lambda$ is the wavelength of the optical signal and hence of the transmitted light wave.

Figure 3:
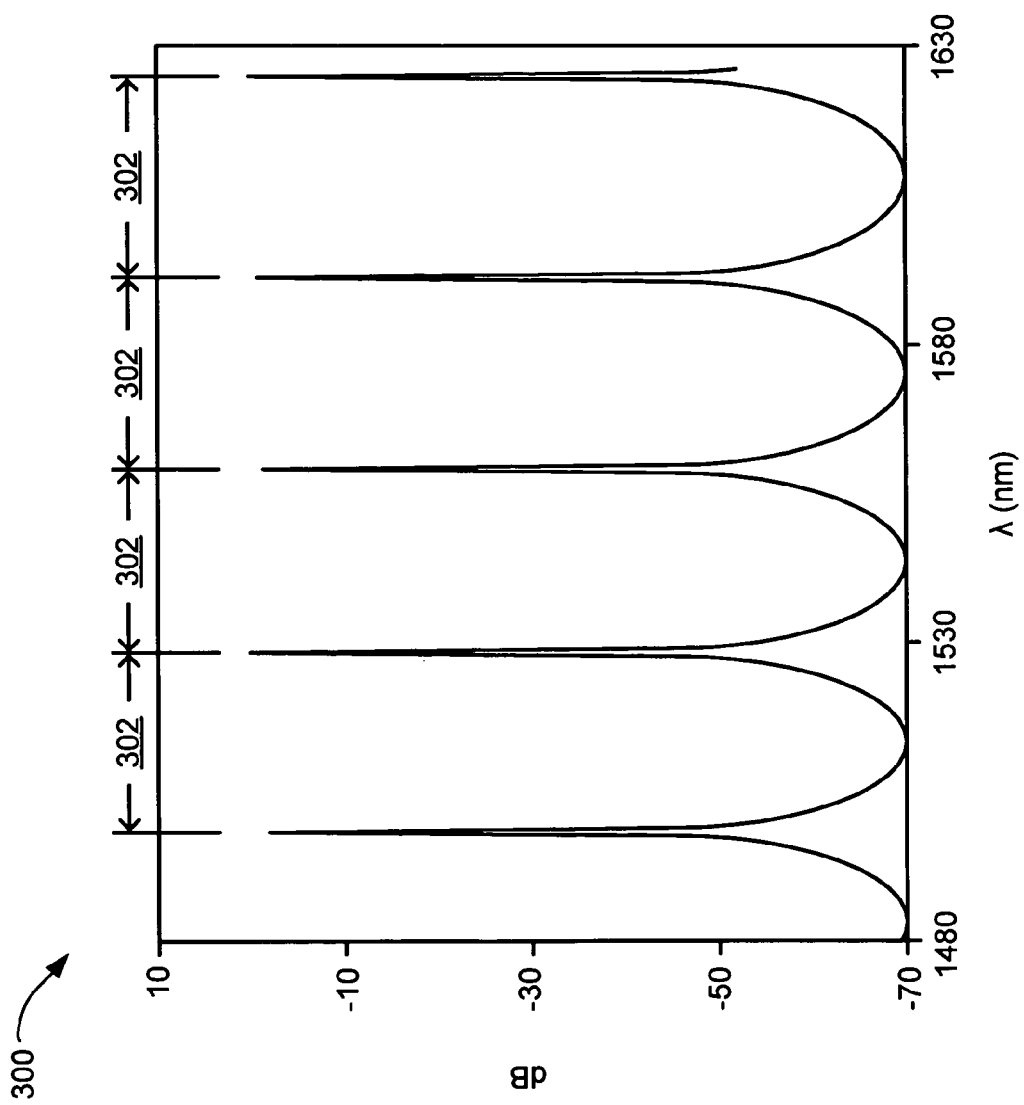
FIG. 3 is a graph of an Airy Function usable to describe the transmission profile of a Fabry-Perot filter.

Referring now to FIG. 3, therein is shown a graph 300 of an Airy Function $A(\lambda)$ that can be used to describe the transmission profile of a FP filter:

$$A(\lambda) = \frac{I_0}{1 + \left(\frac{2F}{\pi}\sin\frac{2\pi nL}{\lambda}\right)^2}, \qquad (2)$$

where:

$I_0$ is the peak transmission optical intensity,

F is the finesse of the FP filter, and $\lambda$ is the wavelength of the light wave.

Then the following equation establishes the resonant frequencies $f_m$ of the FPI 100:

$$f_m = \frac{c}{2Ln}m \qquad (3)$$

The mode spacing is defined as the Free Spectrum Range ("FSR") 302 of the FPI 100. In terms of the frequency f of the light wave, its FSR 302 is:

$$FSR(f) = \frac{c}{2Ln} \quad (4)$$

In terms of the wavelength λ of the light wave, its FSR 302 is:

$$FSR(\lambda) = \frac{\lambda^2}{2Ln} \quad (5)$$

For a FP filter with a FSR 302 of about 180 nm in the 1500 nm region, the cavity length is about 12.5 μm.

The BW of the FPI 100 is defined as the full width at half maximum ("FWHM"). It is defined by the following equation (Hz):

$$BW = \frac{1-r}{\sqrt{r}} \frac{c}{2\pi nL} \quad (6)$$

where:
 r is the reflectivity of the filter mirrors,
 c the light speed in a vacuum,
 n the index of refraction of the media inside the filter cavity, and
 L the length of the filter's cavity (e.g., the cavity 106).

Relating the BW to the mode spacing, e.g. the FSR 302, yields the finesse F:

$$F = \frac{FSR}{BW} = \frac{\pi\sqrt{r}}{1-r} \quad (7)$$

The Airy Function A(λ) can be approximated by the following Lorentzian distribution:

$$L(f) = \frac{I_0}{1 + 4\left(\frac{f-f_0}{BW}\right)^2}, \quad \left(\text{for} \frac{f-f_0}{FSR} \ll 1\right) \quad (8)$$

where:
 f is the frequency of the transmitted light-wave,
 $f_0$ is the peak transmission frequency, and
 FSR is the free spectrum range of the FP filter.

The 3-dB BW of the Lorentzian distribution is the same as that of the FP filter.

For dense wavelength division multiplexing ("DWDM") applications in fiber optical communications, the requirement for the filter BW is in the range of several tens of picometers ("pm"). In former FP filter OSA implementations, the wavelength scanning range of the FP filter OSA was slightly smaller than its FSR. For example, if the BW needs to be 25 pm, the FSR needs to be 100 nm and the finesse needs to be 4000. Unfortunately, this requires a mirror reflectivity greater than 99.9577%, which is an unrealistically high value for commercial purposes. In another example having the same 25 pm BW, to achieve a FSR of about 400 nm, the finesse needs to be greater than 16,000 across the whole 400 nm range, which is beyond current technology limits.

However, it has been discovered, according to the present invention and as taught herein, that these technology hurdles can be overcome through the simultaneous use of multiple FSRs 302 which can be configured to perform the desired scan simultaneously. This makes it possible to maintain and utilize commercially practical FSRs and BWs by concatenating multiple FSRs together.

Referring now to FIG. 4, therein is shown an optical circuit schematic diagram of a full band OSA 400 according to an embodiment of the present invention, and employing a tunable optical filter such as the TFPF 402. The cavity length of the TFPF 402 used in the full band OSA 400 is driven conventionally by a piezoelectric transducer (not shown), which is controlled through a suitable digital-to-analog converter ("DAC") circuit 404 by a controller/analyzer 406.

According to equation (1) above, the resonant optical wavelength of the TFPF 402 is a function of its cavity length L (FIG. 2). However, equation (1) also shows that at the same cavity length, separate multiple optical wavelengths can resonate simultaneously, with each such wavelength at a different optical order m. The FSR 302 (FIG. 3) of the TFPF 402 defines the maximum wavelength range that the filter can scan without interference of signals from its neighboring optical orders. As shown by the previous FSR examples for FP filters, this explains the very limited wavelength ranges of existing OSAs that are based on FP filters.

The present invention overcomes these limitations by utilizing multiple optical orders of the TFPF 402 to scan across different wavelength bands simultaneously, through the use of well-defined band pass filters ("BPFs"). In one embodiment, the TFPF 402 of the full band OSA 400 has a FSR 302 of about 180 nm (in the 1550 nm region) and 3-dB BW of about 50 pm. With BPFs as described more particularly below, multiple optical orders of the TFPF 402 can be used to scan across different wavelength bands simultaneously. The OSA 400 can thus be used to scan across wavelength ranges much larger than the FSR 302 of the TFPF 402, for example from 1260 nm to 1640 nm, which covers the full wavelength bands (O, E, S, C, and L bands) for telecommunication ("telecom") applications. The present invention thus enables construction of an OSA for full telecom band applications using a single FP filter.

The full band OSA 400 contains a reference arm 408 that has a light source 410 and a filter 412 defined therein. The light source 410 is a broad band LED, for example centered around 1550 nm, connected to the controller/analyzer 406 through a driver 414. The filter 412 includes a fixed cavity length FP interferometer 416, which has a FSR of about 100 GHz (800 pm) and a BW of about 80 pm. The fixed cavity length FP interferometer 416 is combined with a Fiber Bragg Grating ("FBG") 418 with a 1 nm BW to block one of its resonant peaks around 1550 nm. The reference arm 408 with the fixed cavity length FP interferometer 416 and the FBG 418 thus constitutes a wavelength reference system with pico-meter accuracy. A thermistor 420 provides temperature calibration information about the filter 412 to the controller/analyzer 406.

The fixed cavity length FP interferometer 416 is a fixed cavity length FP interferometer with a fixed FSR of, for example, 100 GHz. The FBG 418 has a BW slightly larger than that of the resonant peaks of the fixed cavity length FP interferometer 416. The FBG 418 has a notching position that is pre-defined to block one of the resonant peaks of the fixed cavity length FP interferometer 416. This combination of the LED light source 410, the fixed cavity length FP interferometer 416, and the FBG 418 is then able to provide a precise wavelength reference that is less than one pm for the S, C, and L telecom bands.

The full band OSA 400 also contains an unknown signal arm 422 that has the TFPF 402 and the DAC circuit 404 defined therein. In addition, the unknown signal arm 422 has BPFs 424, 426, 428, 430, and 432, detectors 434, 436, and 438, and circuitry such as an analog-to-digital converter ("ADC") 440 defined therein. The BPFs 424, 426, and 428, and the detector 434 define a first detection branch 442, for example, for the O telecom band. The BPFs 424, and 430, and the detector 436 define a second detection branch 444, for example, for the E telecom band. The BPF 432 and the detector 438 define a third detection branch 446, for example, for the S, C, and L ("S-C-L") telecom bands. The outputs of the first, second, and third detection branches 442, 444, and 446 are respectively connected to the ADC 440, which processes the outputs into digital form and forwards the respective data to the controller/analyzer 406. The unknown signal arm 422 is thus configured for scanning a wavelength range of an optical signal that is larger than the FSR 302 of the TFPF 402, and the detection branches are configured for simultaneously and individually detecting separate multiple optical orders of the wavelengths scanned and filtered by the TFPF 402.

An unknown optical signal, such as a wavelength division multiplexing ("WDM") input 448, is supplied by an input branch 450 to an optical switch 452. Before the full band OSA 400 scans the unknown signal from the WDM input 448, the optical switch 452 is set to the reference arm 408 that is configured to provide wavelength reference and calibration information to the TFPF 402. The wavelength reference and calibration information is then scanned and the results saved in the controller/analyzer 406.

The optical switch 452 is then set to connect to the input branch 450 and a scan is again taken, this time on the unknown signal from the WDM input 448, with the TFPF 402 filtering the unknown optical signal therethrough. The resulting outputs from the first, second, and third detection branches 442, 444, and 446 are then analyzed as described below to provide the full band spectrum analysis, on an output 454, of the unknown signal from the WDM input 448.

Figure 4A:
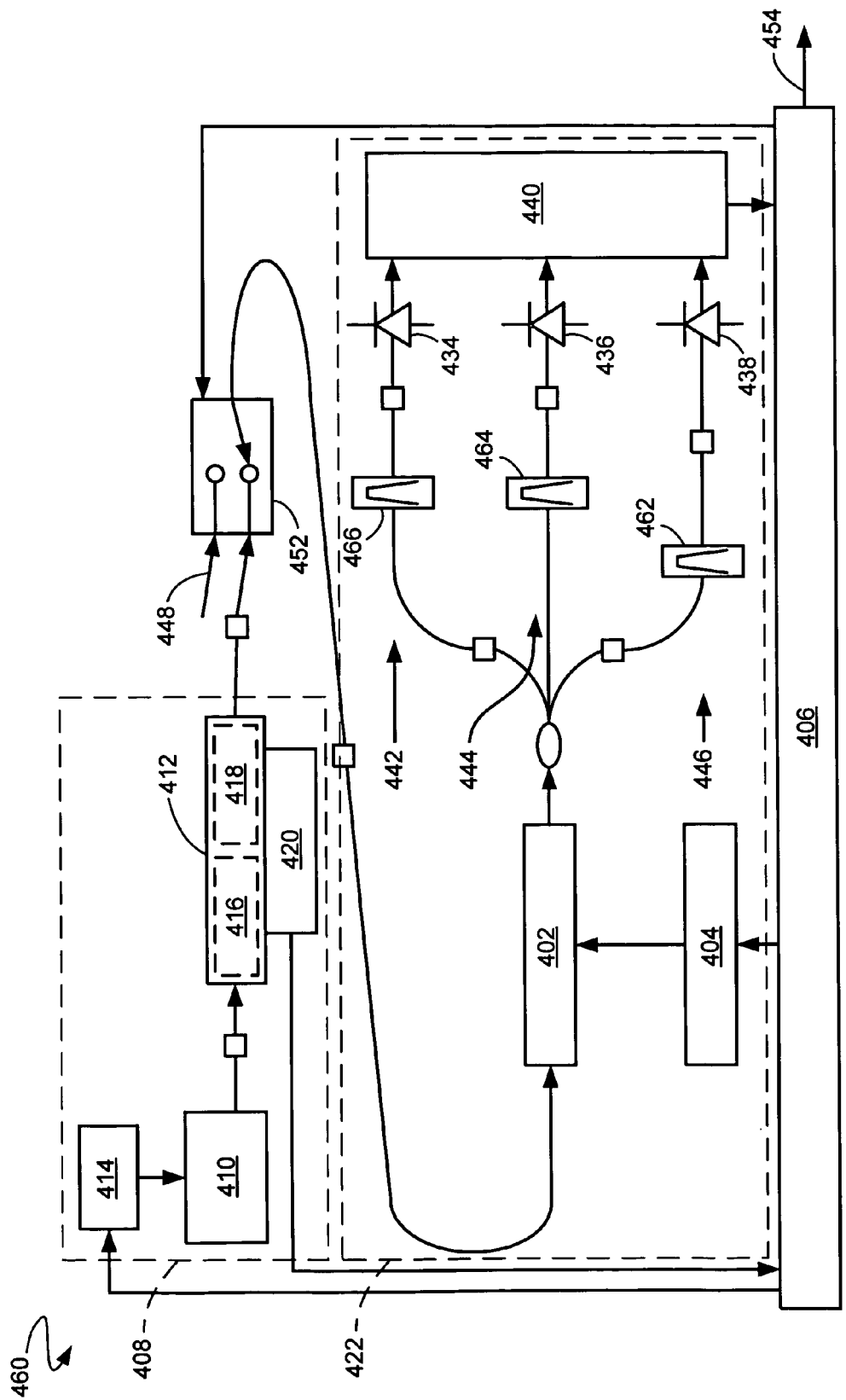
FIG. 4A is an optical circuit schematic diagram of a full band optical spectrum analyzer according to another embodiment of the present invention.

Referring now to FIG. 4A, therein is shown an optical circuit schematic diagram of a full band OSA 460 according to another embodiment of the present invention. In this embodiment, the optical signal from the TFPF 402 is split three ways and sent to the first, second, and third detection branches 442, 444, and 446 which, in this embodiment, have respective BPFs 466, 464, and 462. Then, to detect the three telecom bands as described, the BPFs 462, 464, and 466 have the following values:

BPF 462: pass from ~1457 to ~1640 nm, blocking other wavelengths;
BPF 464: pass from ~1345 to ~1490 nm, blocking other wavelengths;
BPF 466: pass from ~1260 to ~1378 nm, blocking other wavelengths.

This produces and defines a wavelength detection range 508 (see FIG. 5) of 1260 nm to 1378 nm for the first detection branch 442, a wavelength detection range 510 (see FIG. 5) of 1345 nm to 1490 nm for the second detection branch 444, and a wavelength detection range 512 (see FIG. 5) of 1457 nm to 1640 nm for the third detection branch 446.

In another embodiment, the passing bands of the BPFs 462, 464, and 466 can be slightly different. For example:

BPF 462: pass from ~1465 to ~1640 nm, blocking other wavelengths;
BPF 464: pass from ~1350 to ~1480 nm, blocking other wavelengths;
BPF 466: pass from ~1260 to ~1370 nm, blocking other wavelengths.

The passing bands of pairs of adjacent BPFs thus have some overlap, for example an overlap of 10 to 30 nm wide. However, while this overlap has been discovered to be beneficial, the overlap should not be so wide that signals from different optical orders are not distinguished.

Figure 4B:
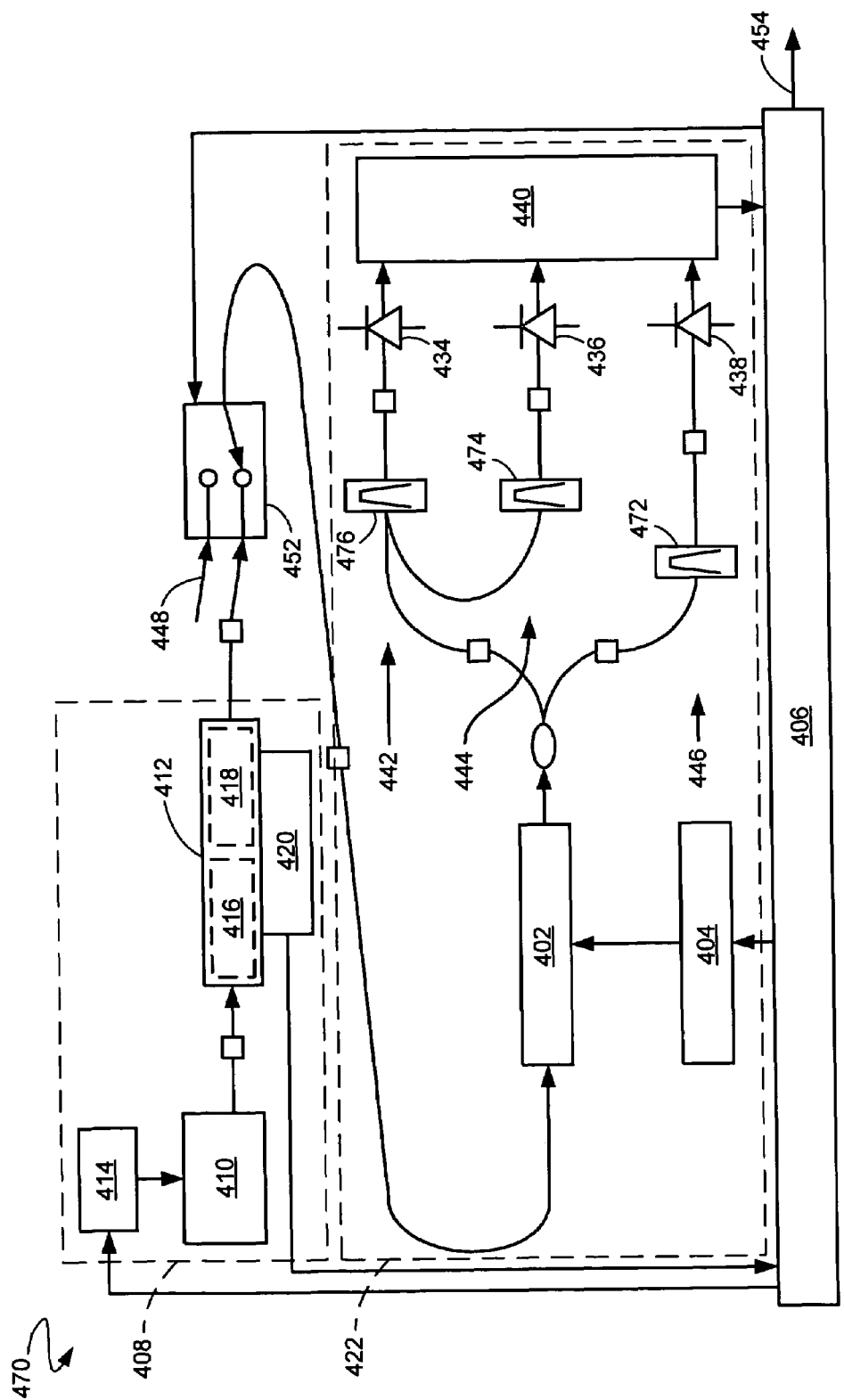
FIG. 4B is an optical circuit schematic diagram of a full band optical spectrum analyzer according to still another embodiment of the present invention.

Referring now to FIG. 4B, therein is shown an optical circuit schematic diagram of a full band OSA 470 according to still another embodiment of the present invention. In this embodiment, the optical signal from the TFPF 402 is split two ways and sent to the first and third detection branches 442 and 446. In this embodiment, the detection branch 442 has a long pass filter ("LPF") 476, and the detection branch 446 has a BPF 472. The detection branch 444 has a BPF 474 connected to the common/reflection port of the LPF 476. Then, to detect the three telecom bands as described, the filters 472, 474, and 476 have the following values:

BPF 472, pass from ~1345 to ~1490 nm, blocking other wavelengths;
BPF 474, pass from ~1260 to ~1378 nm, blocking other wavelengths;
LPF 476, pass from ~1465 to ~1640 nm, reflecting from ~1260 to ~1457 nm.

This produces and defines a wavelength detection range 508 of 1260 nm to 1378 nm for the second detection branch 444, a wavelength detection range 510 of 1345 nm to 1490 nm for the third detection branch 446, and a wavelength detection range 512 of 1465 nm to 1640 nm for the first detection branch 442.

In another embodiment, the passing bands of the filters 472, 474, and 476 can be slightly different. For example:

BPF 472, pass from ~1350 to ~1480 nm, blocking other wavelengths;
BPF 474, pass from ~1260 to ~1370 nm, blocking other wavelengths;
LPF 476, pass from ~1455 to ~1640 nm, reflecting from ~1260 to ~1440 nm.

The passing bands of pairs of adjacent filters thus have some overlap, for example an overlap of 10 to 30 nm wide. However, while this overlap has been discovered to be beneficial, the overlap should not be so wide that signals from different optical orders are not distinguished.

Figure 5:
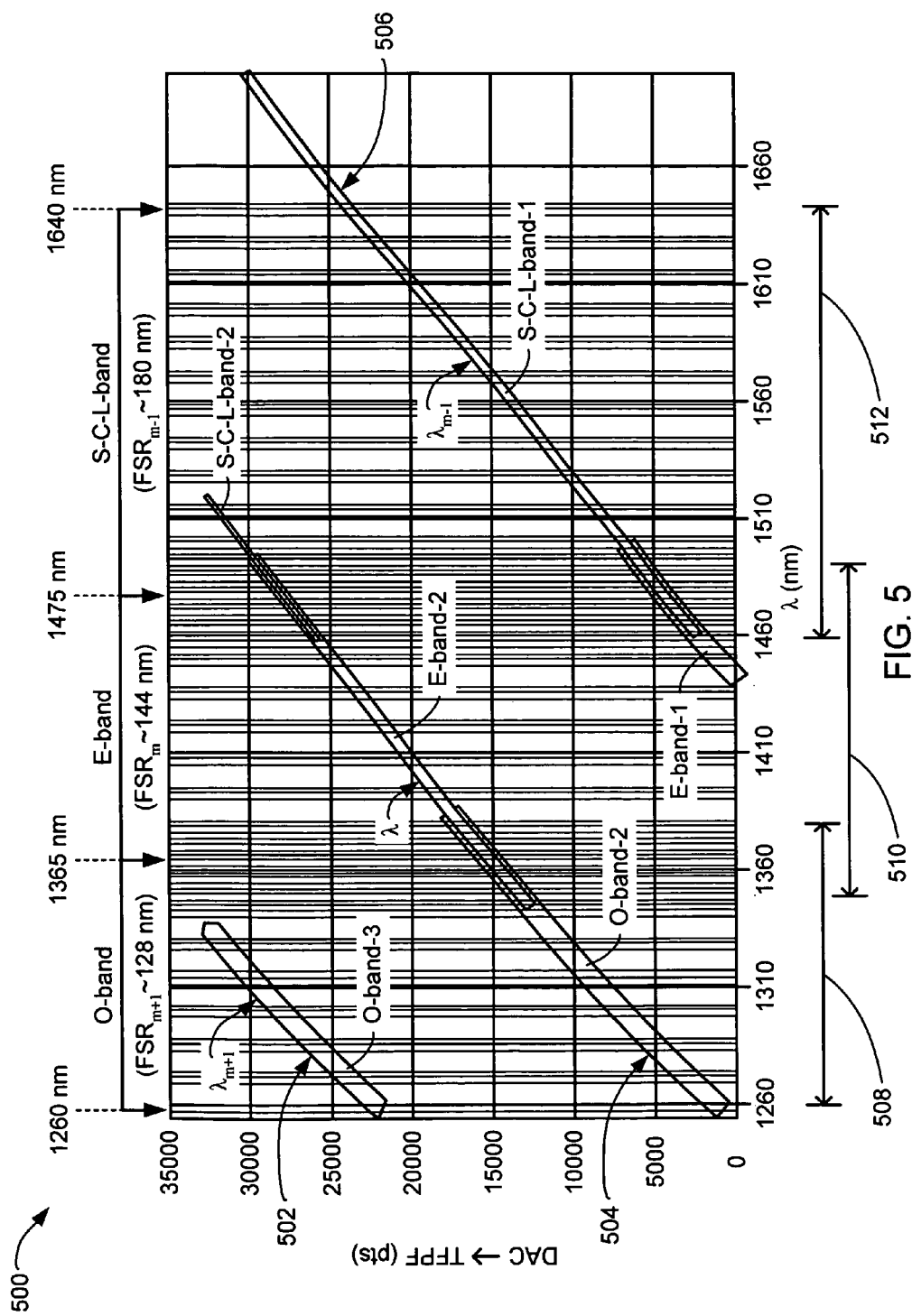
FIG. 5 is a graph depicting the multiple optical orders of the optical filters of FIGS. 4, 4A, and 4B, and depicting seamless optical spectrum analysis over the full telecom wavelength range.

Referring now to FIG. 5, therein is shown a graph 500 depicting the multiple optical orders of the TFPF 402 (FIGS. 4, 4A, and 4B), and the method of the present invention for seamless OSA scanning therewith over the full telecom wavelength range of 1260 to 1640 nm. The various filters (for example, BPFs 462, 464, and 466 (FIG. 4A)) are well defined, as described above, to provide appropriate blocking on neighboring optical orders, e.g. the orders m+1, m, and m−1. Thus, in the embodiment described above in connection with FIG. 4A, the BPF 462 for the S-C-L bands has a pass channel from about 1457 nm to 1640 nm (the wavelength detection range 512) and blocks signals from other wavelength bands. The BPF 464 for the E band has a pass channel from about 1345 nm to 1490 nm (the wavelength detection range 510) and blocks signals from other wavelength bands. The BPF 466 for the O band has a pass channel from about 1260 nm to 1378 nm (the wavelength detection range 508) and blocks signals from other wavelength bands.

In operation, the DAC circuit 404 (FIG. 4) controls the cavity length of the TFPF 402 in a sweeping mode to define a scan as the TFPF 402 is continuously tuned over the different wavelength components through time across the unknown signal of the WDM input 448 (FIG. 4). In FIG. 5, the Y-axis ("DAC→TFPF") is the DAC circuit 404 input reading (in points) to the TFPF 402, which is proportional to the voltage controlling the piezoelectric transducer ("PZT") (not shown) in the TFPF 402. The X-axis is the resonant wavelength λ of the TFPF 402, which corresponds to the instant cavity length of the TFPF 402. As is known in the art, this cavity length is a function of the PZT's controlling voltage, as just described.

In FIG. 5, the six curves ("O-band-3", "O-band-2", "E-band-2", "S-C-L-band-2", "E-band-1", and "S-C-L-band-1") show how the resonant wavelength of the TFPF 402 responds to the controlling points from the DAC circuit 404 for different optical orders. The six curves can be joined into three extended curves, wherein the O-band-3 curve is a first extended curve 502, the O-band-2, E-band-2, and S-C-L-band-2 curves are a second extended curve 504, and the E-band-1 and S-C-L-band-1 curves are a third extended curve 506. The three extended curves 502, 504, and 506 show three respective different optical orders for $\lambda_{m+1}$, $\lambda_m$, and $\lambda_{m-1}$ of the TFPF 402.

As an example, when the DAC circuit 404 sends out points at about 1190 (just above the X-axis), the signals at about 1260 nm and about 1455 nm will start to resonate at the same time. However, the detector 434 (FIG. 4A) for the O band will see only the 1260 nm signal, in its wavelength detection range 508. It cannot see the 1455 nm signal, which is outside its wavelength detection range 508 and is blocked by the BPF 466 for the first detection branch 442 (FIG. 4A).

As the DAC circuit 404 input increases during the spectrum analysis sweep, the resonant wavelength of the TFPF 402 increases, and the process continues until 1378 nm, when the BPF 466 for the O band blocks the signal for its detector 434. However, the detector 436 (FIG. 4A) for the E band starts to collect data at about 1345 nm. The region between 1345 nm and 1378 nm is detected by both the O band and E band detectors 434 and 436 to provide seamless scanning across the O and E bands.

The detector 436 for the E band continues to collect data until 1490 nm, when the BPF 464 for the E band blocks the signal for its detector 436. The detector 438 (FIG. 4A) for the S-C-L bands starts to collect data at about 1457 nm. The region between 1457 nm and 1490 nm is detected by both the E band and the S-C-L bands detectors 436 and 438 to provide seamless scanning across the E and S-C-L bands.

In one embodiment, the DAC circuit 404 sweeps from 0 to 32768 points. Both Equation (1) and FIG. 5 show that each wavelength may resonate at different optical orders. For example, a signal at 1260 nm would resonate at two different DAC values, approximately 1190 and 22220. A signal at 1460 nm would resonate at another two DAC values, approximately 2190 and 26110. For the O band, any DAC values higher than 17000 points (corresponding to approximately 1380 nm) can then be disregarded to avoid confusion due to these multiple optical orders. Similarly, for the E band, any DAC values lower than 12000 points (corresponding to approximately 1330 nm) can then be disregarded to avoid such confusion. Thus for the whole O and E bands, only those DAC points on the curve O-band-2 and the curve E-band-2 are used, which is due to the $m^{th}$ optical order. For simplicity, the number "2" is used to denote order $m^{th}$. For the S, C, and L bands, only those DAC points on the curve S-C-L-band-1 are used, which is due to the $m-1^{th}$ optical order. For simplicity, the number "1" is used to denote order $m-1^{th}$.

It has thus been discovered, as taught by the present invention, that a seamless scan for the full telecommunications wavelength band is now possible using a FP filter-based OSA. This wide scanning range is achieved without sacrificing the BW of the filter, as defined by equation (6). With previous techniques and designs, for the same finesse, the larger the FSR, the larger the BW of the filter, and thus the poorer the spectral resolution. However, the present invention achieves a larger OSA scanning range (i.e., achieves a greater net FSR) while maintaining the same FSR for each optical order. Thus, the original BW for each optical order of the FP filter is maintained, preserving the high spectral resolution of the filter (comparable to that of the filter's intrinsic FSR) for the entire OSA scanning range.

Another significant improvement afforded by the present invention is that multiple FSRs or optical orders can be scanned simultaneously, thereby greatly speeding up the scanning process compared with the scanning speed when only a single FSR is scanned at a time.

Accordingly, the several optical orders of the TFPF 402 are completely separated, such that multiple order optical signals can be simultaneously yet distinctly and separately detected and analyzed. Accordingly, the full band OSA is able to successfully and beneficially utilize a FP filter such as the TFPF 402 to rapidly scan a much broader range that is much larger than the FP filter's own FSR 302 itself.

The isolation provided by the BPFs for the embodiment just described is about 40 dB, which assures a 40 dB measurement range for the optical-signal-to-noise-ratio ("OSNR"). Based on this disclosure, it will now be clear to one of ordinary skill in the art that with better isolation, an even better dynamic range for the OSNR can be provided.

Figure 6:
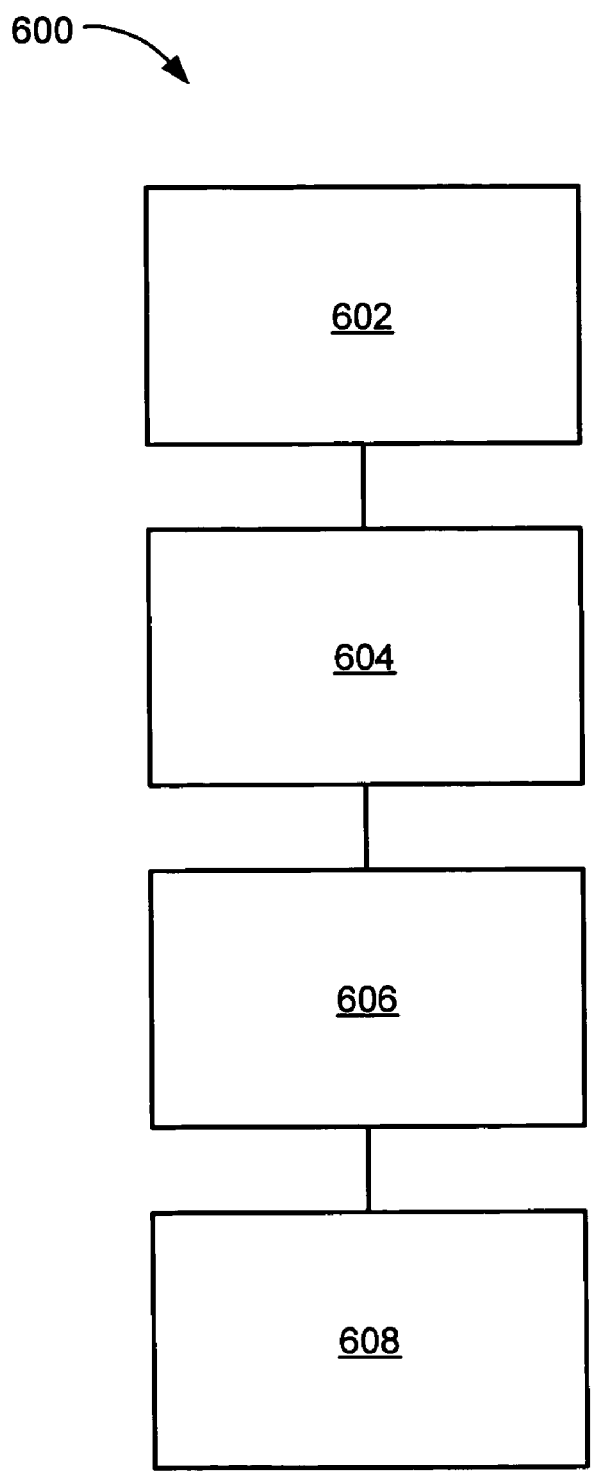
FIG. 6 is a flow chart of a method for optical spectrum analysis in accordance with an embodiment of the present invention.

Referring now to FIG. 6, therein is shown a flow chart of a method 600 for optical spectrum analysis in accordance with an embodiment of the present invention. The method 600 includes providing a tunable optical filter in a block 602; scanning a wavelength range of an optical signal that is larger than the free spectrum range of the tunable optical filter in a block 604; filtering the optical signal through the tunable optical filter in a block 606; and individually detecting separate multiple optical orders of the wavelengths scanned and filtered by the tunable optical filter in a block 608.

It has been discovered that the present invention thus has numerous advantages.

Principally, it enables the use of multiple FSRs corresponding to different optical orders in a single FP filter, which can be configured to perform a scan simultaneously in the multiple FSRs. It has been discovered, as a result, that it is now possible to maintain and utilize commercial FP filters with practical FSRs and BWs by concatenating the filter's multiple FSRs together, as taught herein. Thus, with the use of well-defined band pass filters, the OSA can scan a broader range that is larger than the FP filter's FSR.

Another advantage, accordingly, is that a FP filter can be used to construct an OSA with a wavelength range greater than the FP filter's own FSR, thus enabling a FP filter OSA to perform larger wavelength scans while maintaining the excellent high spectral resolution of the FP filter itself for the entire OSA scanning range.

Still another advantage, which will now be clear to one of ordinary skill in the art based on this disclosure, is that the passing and blocking ranges of each of the filters can be chosen and adjusted to different appropriate values according to the preferences or requirements of the particular FP filter and OSA implementation at hand.

Yet another advantage is that additional filters and detectors can be employed to incorporate additional detection branches into the OSA in order to utilize other FP filter FSR values for improved spectral resolution, and/or for extending the scanning range of the OSA to cover even more wavelengths.

Another advantage of the present invention is that any number of multiple FSRs or optical orders can thus be scanned simultaneously, thereby greatly speeding up the scanning process over the speed of scanning only a single FSR at a time.

Yet another important advantage of the present invention is that it valuably supports and services the historical trend of reducing costs, simplifying systems, and increasing performance.

These and other valuable aspects of the present invention consequently further the state of the technology to at least the next level.

Thus, it has been discovered that the optical spectrum analysis method and apparatus of the present invention furnish important and heretofore unknown and unavailable solutions, capabilities, and functional advantages for optical spectrum analysis. The resulting processes and configurations are straightforward, cost-effective, uncomplicated, highly versatile and effective, can be implemented by adapting known technologies, and are thus readily suited for efficiently and economically manufacturing and operating high performance OSA devices.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations, which fall within the scope of the included claims. All matters hithertofore set forth herein or shown in the accompanying drawings are to be interpreted in an illustrative and non-limiting sense.

The invention claimed is:

1. A method for optical spectrum analysis, comprising:
   providing a tunable optical filter;
   scanning a wavelength range of an optical signal that is larger than the free spectrum range of the tunable optical filter;
   filtering the optical signal through the tunable optical filter; and
   simultaneously and individually detecting and concatenating separate multiple optical orders of the wavelengths scanned and filtered by the tunable optical filter.

2. The method of claim 1 wherein individually detecting separate multiple optical orders further comprises:
   providing a plurality of filter detection branches that define distinct wavelength detection ranges; and
   detecting the separate multiple optical orders in the distinct wavelength detection ranges of the respective filter detection branches.

3. The method of claim 1 wherein individually detecting separate multiple optical orders further comprises detecting the separate multiple optical orders in distinct wavelength ranges in which at least two of the distinct wavelength ranges partially overlap.

4. The method of claim 1 wherein scanning a wavelength range of the optical signal that is larger than the free spectrum range of the tunable optical filter further comprises scanning a range of wavelengths at least from substantially 1260 nm to substantially 1640 nm.

5. The method of claim 1 further comprising providing wavelength reference and calibration information to the tunable optical filter.

6. A method for optical spectrum analysis, comprising:
   providing a tunable Fabry-Perot optical filter;
   scanning a wavelength range of an optical signal that is larger than the free spectrum range of the tunable Fabry-Perot optical filter;
   filtering the optical signal through the tunable Fabry-Perot optical filter; and
   simultaneously and individually detecting separate multiple optical orders of the wavelengths scanned and filtered by the tunable Fabry-Perot optical filter by simultaneously scanning in multiple free spectrum ranges of the tunable Fabry-Perot optical filter across different wavelength bands and concatenating the multiple free spectrum ranges together, to maintain a spectral resolution for the entire scanning range comparable to that of the Fabry-Perot optical filter's free spectrum range.

7. The method of claim 6 wherein simultaneously and individually detecting separate multiple optical orders further comprises:
   providing a plurality of band pass filter detection branches that each define distinct wavelength detection ranges; and
   detecting the separate multiple optical orders in the distinct wavelength detection ranges of the respective band pass filter detection branches.

8. The method of claim 6 wherein simultaneously and individually detecting separate multiple optical orders further comprises detecting the separate multiple optical orders in distinct wavelength ranges in which at least two of the distinct wavelength ranges partially overlap to provide substantially seamless scanning thereacross.

9. The method of claim 6 wherein scanning a wavelength range of the optical signal that is larger than the free spectrum range of the tunable Fabry-Perot optical filter further comprises scanning a range of wavelengths at least from substantially 1260 nm to substantially 1640 nm.

10. The method of claim 6 further comprising providing wavelength reference and calibration information to the tunable Fabry-Perot optical filter before scanning the wavelength range of the optical signal.

* * * * *